US008443187B1

(12) United States Patent
Orr

(10) Patent No.: US 8,443,187 B1
(45) Date of Patent: May 14, 2013

(54) AUTHENTICATION OF COMPUTING DEVICES IN SERVER BASED ON MAPPING BETWEEN PORT IDENTIFIER AND MAC ADDRESS THAT ALLOWS ACTIONS-PER-GROUP INSTEAD OF JUST ACTIONS-PER-SINGLE DEVICE

(75) Inventor: Michael Orr, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 897 days.

(21) Appl. No.: 12/101,668

(22) Filed: Apr. 11, 2008

Related U.S. Application Data

(60) Provisional application No. 60/911,383, filed on Apr. 12, 2007.

(51) Int. Cl.
G06F 15/16 (2006.01)
H04L 29/06 (2006.01)

(52) U.S. Cl.
USPC ............... 713/155; 713/156; 726/2; 726/5

(58) Field of Classification Search .......... 713/155, 713/156, 157, 184, 185; 726/21, 27, 2, 5
See application file for complete search history.

(56) References Cited

U.S. PATENT DOCUMENTS

| | | | |
|---|---|---|---|
| 5,390,165 A | 2/1995 | Tuch | |
| 5,481,733 A | 1/1996 | Douglis et al. | |
| 5,617,118 A | 4/1997 | Thompson | |
| 5,673,416 A | 9/1997 | Chee et al. | |
| 5,771,356 A | 6/1998 | Leger et al. | |
| 5,828,835 A | 10/1998 | Isfeld et al. | |
| 5,884,099 A | 3/1999 | Klingelhofer | |
| 6,014,722 A | 1/2000 | Rudin et al. | |
| 6,092,108 A | 7/2000 | DiPlacido et al. | |
| 6,230,277 B1 | 5/2001 | Nakaoka et al. | |
| 6,330,626 B1 | 12/2001 | Dennin et al. | |
| 6,463,509 B1 | 10/2002 | Teoman et al. | |
| 6,564,318 B1 | 5/2003 | Gharda et al. | |
| 6,601,167 B1 | 7/2003 | Gibson et al. | |
| 6,711,447 B1 | 3/2004 | Saeed | |
| 6,756,988 B1 | 6/2004 | Wang et al. | |

(Continued)

FOREIGN PATENT DOCUMENTS

EP 1847911 10/2007
JP 08076872 3/1996

(Continued)

OTHER PUBLICATIONS

"Non-Final Office Action", U.S. Appl. No. 12/271,761, (Oct. 3, 2011), 6 pages.

(Continued)

*Primary Examiner* — Krisna Lim

(57) ABSTRACT

In one or more embodiments, attributes other than a supplicant's MAC address can be used for the user name in the authentication process in a network computing environment. In at least some embodiments, doing so utilizes an association structure, such as a table, that is already resident at the authentication server. By using attributes other than a supplicant's MAC address, various matching scenarios can be provided by the authentication server in which authentication or authorization takes place responsive to satisfying conditions defined in the authentication server's association or database. Furthermore, a variety of non-authentication scenarios can be supported using the authentication server's association.

20 Claims, 8 Drawing Sheets

U.S. PATENT DOCUMENTS

| | | | |
|---|---|---|---|
| 6,823,472 B1 | 11/2004 | DeKoning et al. | |
| 6,832,280 B2 | 12/2004 | Malik et al. | |
| 7,089,419 B2 | 8/2006 | Foster et al. | |
| 7,103,788 B1 | 9/2006 | Souza et al. | |
| 7,126,913 B1 | 10/2006 | Patel et al. | |
| 7,194,638 B1 | 3/2007 | Larky | |
| 7,266,842 B2 | 9/2007 | Foster et al. | |
| 7,299,365 B2 | 11/2007 | Evans | |
| 7,308,591 B2 | 12/2007 | Dubinsky | |
| 7,356,707 B2 | 4/2008 | Foster et al. | |
| 7,496,952 B2* | 2/2009 | Edwards et al. | 726/4 |
| 7,571,216 B1 | 8/2009 | McRae et al. | |
| 7,596,614 B2* | 9/2009 | Saunderson et al. | 709/224 |
| 7,606,230 B1* | 10/2009 | Cohen et al. | 370/392 |
| 7,774,635 B2 | 8/2010 | Shiota | |
| 7,788,670 B2 | 8/2010 | Bodas et al. | |
| 7,818,389 B1 | 10/2010 | Chiang et al. | |
| 7,873,841 B2 | 1/2011 | Mullis, II et al. | |
| 7,995,596 B2 | 8/2011 | Kuila et al. | |
| 8,000,284 B2 | 8/2011 | Lott et al. | |
| 8,001,592 B2 | 8/2011 | Hatakeyama | |
| 8,095,816 B1 | 1/2012 | Chan | |
| 8,139,521 B2* | 3/2012 | Mukherjee et al. | 370/328 |
| 8,171,309 B1 | 5/2012 | Poo et al. | |
| 8,296,555 B2 | 10/2012 | Chu | |
| 8,321,706 B2 | 11/2012 | Zhang | |
| 8,327,056 B1 | 12/2012 | Chan | |
| 2002/0069354 A1 | 6/2002 | Fallon et al. | |
| 2002/0087816 A1 | 7/2002 | Atkinson et al. | |
| 2003/0014368 A1* | 1/2003 | Leurig et al. | 705/64 |
| 2003/0200453 A1 | 10/2003 | Foster et al. | |
| 2003/0200454 A1 | 10/2003 | Foster et al. | |
| 2003/0208675 A1 | 11/2003 | Burokas et al. | |
| 2003/0236991 A1* | 12/2003 | Letsinger | 713/200 |
| 2004/0125679 A1 | 7/2004 | Kwean | |
| 2004/0266386 A1 | 12/2004 | Kuo | |
| 2005/0033869 A1 | 2/2005 | Cline | |
| 2005/0055547 A1* | 3/2005 | Kawamura | 713/155 |
| 2005/0086551 A1 | 4/2005 | Wirasinghe et al. | |
| 2005/0108171 A1 | 5/2005 | Bajikar et al. | |
| 2005/0138365 A1* | 6/2005 | Bellipady et al. | 713/158 |
| 2005/0156925 A1 | 7/2005 | Fong et al. | |
| 2006/0072748 A1 | 4/2006 | Buer | |
| 2006/0075259 A1 | 4/2006 | Bajikar et al. | |
| 2006/0123248 A1 | 6/2006 | Porter et al. | |
| 2006/0136735 A1 | 6/2006 | Plotkin et al. | |
| 2006/0142906 A1 | 6/2006 | Brozovich et al. | |
| 2006/0156390 A1* | 7/2006 | Baugher | 726/5 |
| 2007/0005824 A1 | 1/2007 | Howard | |
| 2007/0011445 A1 | 1/2007 | Waltermann et al. | |
| 2007/0038866 A1* | 2/2007 | Bardsley et al. | 713/182 |
| 2007/0097904 A1* | 5/2007 | Mukherjee et al. | 370/328 |
| 2007/0234028 A1 | 10/2007 | Rothman et al. | |
| 2007/0260905 A1 | 11/2007 | Marsden et al. | |
| 2007/0277051 A1 | 11/2007 | Reece et al. | |
| 2007/0297606 A1 | 12/2007 | Tkacik et al. | |
| 2008/0016313 A1 | 1/2008 | Murotake et al. | |
| 2008/0028243 A1 | 1/2008 | Morisawa | |
| 2008/0034411 A1* | 2/2008 | Aoyama | 726/5 |
| 2008/0046732 A1 | 2/2008 | Fu et al. | |
| 2008/0066075 A1 | 3/2008 | Nutter et al. | |
| 2008/0072311 A1* | 3/2008 | Mullick et al. | 726/15 |
| 2008/0104422 A1 | 5/2008 | Mullis et al. | |
| 2008/0108322 A1* | 5/2008 | Upp | 455/411 |
| 2008/0120717 A1* | 5/2008 | Shakkarwar | 726/18 |
| 2008/0298289 A1 | 12/2008 | Jeyaseelan | |
| 2008/0313462 A1 | 12/2008 | Zhao et al. | |
| 2009/0006658 A1 | 1/2009 | Gough | |
| 2009/0049222 A1 | 2/2009 | Lee et al. | |
| 2009/0199031 A1 | 8/2009 | Zhang | |
| 2010/0023747 A1 | 1/2010 | Asnaashari et al. | |
| 2010/0058045 A1 | 3/2010 | Borras et al. | |
| 2010/0070751 A1 | 3/2010 | Chu | |
| 2010/0174934 A1 | 7/2010 | Zhao | |
| 2013/0046966 A1 | 2/2013 | Chu | |

FOREIGN PATENT DOCUMENTS

| | | |
|---|---|---|
| JP | 10320302 | 12/1998 |
| JP | 2002099502 | 4/2002 |
| JP | 2002215409 | 8/2002 |
| JP | 2004005254 | 1/2004 |

OTHER PUBLICATIONS

"Notice of Allowance", U.S. Appl. No. 12/098,254, (Sep. 28, 2011), 4 pages.

"Extensions to Direct Link Setup (DLS) Comments", *IEEE, P802. 11z*, (Jul. 2009), pp. 1-3.

"Final Office Action", U.S. Appl. No. 12/098,254, (May 18, 2011), 11 pages.

"Final Office Action", U.S. Appl. No. 12/178,268, (May 25, 2011), 13 pages.

"Non-Final Office Action", U.S. Appl. No. 12/098,254, (Jan. 14, 2011), 8 pages.

"Non-Final Office Action", U.S. Appl. No. 12/178,268, (Dec. 22, 2010), 10 pages.

"Part 11—Wireless LAN Medium Access Control (MAC) and Physical Layer (PHY) Specifications", *Information Technology—Telecommunications & Information Exchange Between Systems... International Standard, ISO/IEC 8802-11, First Ed.*, (1999), pp. 1-531.

"PCT Partial Search Report", Application Serial No. PCT/US2008/078343, Partial International Search,(Mar. 5, 2009), 2 pages.

"PCT Search Report and Written Opinion", Application No. PCT/US2009/067767, (Mar. 26, 2010), 12 pages.

"PCT Search Report", Application No. PCT/US2009/056973, (Nov. 4, 2009), 13 pages.

"PCT Search Report", Application Serial No. PCT/US2008/078343, (May 18, 2009), 5 pages.

"Non-Final Office Action", U.S. Appl. No. 12/178,268, (Dec. 21, 2011), 13 pages.

"Non-Final Office Action", U.S. Appl. No. 12/541,731, (Oct. 21, 2011), 9 pages.

"Non-Final Office Action", U.S. Appl. No. 12/559,987, (Nov. 9, 2011), 10 pages.

"Non-Final Office Action", U.S. Appl. No. 12/636,558, (Jan. 10, 2012), 6 pages.

"Notice of Allowance", U.S. Appl. No. 12/098,254, (Dec. 14, 2011), 4 pages.

"Notice of Allowance", U.S. Appl. No. 12/271,761, (Jan. 3, 2012), 6 pages.

"Notice of Allowance", U.S. Appl. No. 12/178,268, (Jul. 2, 2012), 4 pages.

"Final Office Action", U.S. Appl. No. 12/541,731, (May 31, 2012), 11 pages.

"Foreign Office Action", European Patent Application No. 09803951.4, (May 24, 2012), 3 pages.

"Non-Final Office Action", U.S. Appl. No. 12/636,558, (May 29, 2012), 8 pages.

"Non-Final Office Action", U.S. Appl. No. 13/333,551, (Apr. 6, 2012), 5 pages.

"Notice of Allowance", U.S. Appl. No. 12/559,987, (Jun. 15, 2012), 5 pages.

"Notice of Allowance", U.S. Appl. No. 13/333,551, (May 30, 2012), 4 pages.

"Non-Final Office Action", U.S. Appl. No. 12/541,731, Sep. 4, 2012, 11 pages.

"Supplemental Notice of Allowance", U.S. Appl. No. 13/333,551, Oct. 23, 2012, 2 pages.

"Foreign Office Action", Japanese Application No. 2011-527899, Nov. 6, 2012, 4 pages.

"Foreign Office Action", European Patent Application No. 09803951.4, Dec. 13, 2012, 6 pages.

"Notice of Allowance", U.S. Appl. No. 12/636,558, Jan. 9, 2013, 4 pages.

"Foreign Office Action", Japanese Application No. 2011-544456, Jan. 29, 2013, 7 pages.

"Non-Final Office Action", U.S. Appl. No. 13/657,511, Mar. 28, 2013, 13 pages.

"Notice of Allowance", U.S. Appl. No. 12/541,731, Apr. 2, 2013, 8 pages.

* cited by examiner

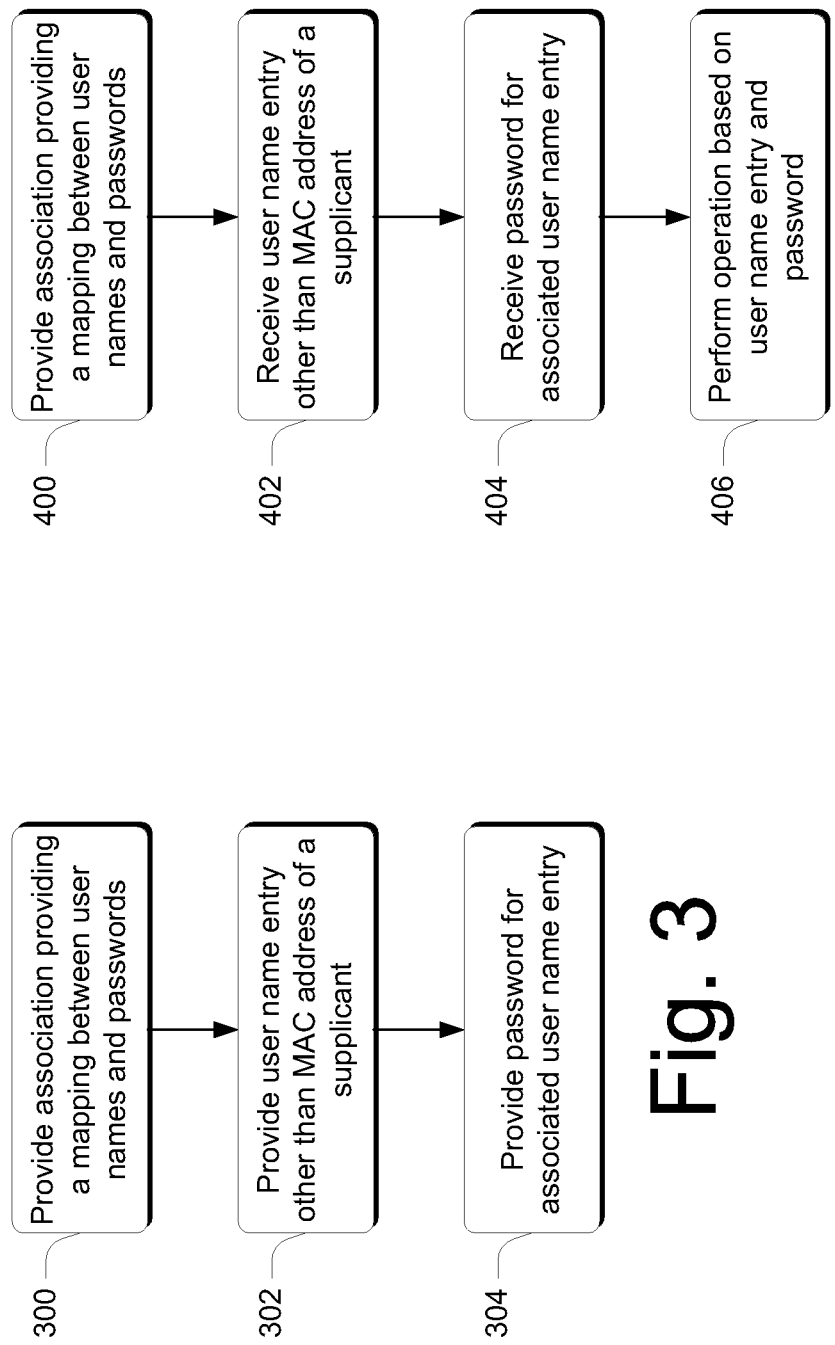

AUTHENTICATION OF COMPUTING DEVICES IN SERVER BASED ON MAPPING BETWEEN PORT IDENTIFIER AND MAC ADDRESS THAT ALLOWS ACTIONS-PER-GROUP INSTEAD OF JUST ACTIONS-PER-SINGLE DEVICE

RELATED APPLICATION

This application claims priority to U.S. Provisional Application Ser. No. 60/911,383, filed on Apr. 12, 2007, the disclosure of which is incorporated by reference herein.

BACKGROUND

IEEE 802.1x is an IEEE standard for port-based Network Access Control and provides authentication to devices attached to a LAN port. This standard can work in connection with wired or wireless LAN networks and provides authentication for establishing point-to-point connections or preventing access from a particular port if authentication fails.

FIG. 1 illustrates a typical 802.1x environment 100. Environment 100 can include various computing devices such as a printer 102, computer 104, and/or any other type of computing device 106. Generally, computing devices such as computing device 106 include one or more processors, one or more computer readable media, and one or more applications than are executable by the processor(s). Environment 100 also includes an authenticator 108 having a plurality of ports 110 through which a connection to various computing devices can be made.

Environment 100 also includes an authentication server 112 (e.g., a RADIUS server) and various network-accessible resources 114. The authenticator 108, authentication server 112, and network-accessible resources 114 are communicatively linked via a suitable network diagrammatically represented at 116.

Generally, computing devices wishing to access network-accessible resources 114 are authenticated by the authentication server 112. The computing devices typically include what is known as supplicant software which enables communication with authenticator 108 and authentication server 112. There are different ways for a computing device (or supplicant) to be authenticated by the authentication server 112. A common, but not exclusive, way for authentication is as follows. When a new supplicant is detected, as by connecting with a port 110 on authenticator 108, the authenticator 108 sends an Extensible Authentication Protocol (EAP) Request/Identity packet to the supplicant. At this point, the port 110 to which the supplicant is connected is in an "unauthorized" state. When the supplicant receives the EAP Request/Identity packet, the supplicant prepares and returns an EAP Response packet to the authenticator 108. This EAP Response packet or other subsequent communication with the authenticator 108 and/or authentication server 112 can include a set of credentials, e.g., a user name and password (or other information) for the associated supplicant. In many cases, the user name and password are the Media Access Control (MAC) address of the supplicant.

When the authenticator 108 receives the EAP Response packet, the authenticator 108 forwards the packet to the authentication server 112. The authentication server and the supplicant can then carry out a challenge/response dialog until the server decides to allow or deny the supplicant access. For example, the authentication server 112 can maintain a table that provides a mapping between user names and passwords. The authentication server 112 then looks up the user name and password in the table and can accept or reject the authentication attempt. If the authentication attempt is accepted, the authenticator 108 will set the associated port 110 to an "authorized" mode and allow normal traffic. Normal traffic can include allowing the supplicant access to the network-accessible resources 114.

One problem with the above-discussed authentication process pertains to the global nature by which a supplicant is authenticated. Specifically, by globally authenticating a supplicant based on the supplicant's MAC address (and/or any other information provided), the supplicant can access network-accessible resources from any authorized port.

SUMMARY

This Summary is provided to introduce subject matter that is further described below in the Detailed Description and Drawings. Accordingly, the Summary should not be considered to describe essential features nor used to limit the scope of the claimed subject matter.

In one or more embodiments, a method comprises storing, in a first network device, an association including a mapping between one or more user names entries and one or more passwords, the one or more user names entries being a name other than a MAC address associated with one or more second network devices to be authenticated by the first network device; and using the association to authenticate the one or more second network devices.

In yet other embodiments, a system comprises an authentication server; and an association associated with the authentication server, wherein the association provides a mapping between one or more user name entries and one or more passwords, the one or more user name entries comprising entries other than a MAC address of a network device to be authenticated by the authentication server, wherein the association is configured to be used by the authentication server to authenticate one or more network devices.

BRIEF DESCRIPTION OF THE DRAWINGS

The same numbers are used throughout the drawings to reference like features.

FIG. 3 is a flow diagram that describes steps a method in accordance with one or more embodiments.

FIG. 4 is a flow diagram that describes steps a method in accordance with one or more embodiments.

DETAILED DESCRIPTION

Overview

In one or more embodiments, attributes other than a supplicant's MAC address can be used for the user name in the authentication process in a network computing environment—e.g., an 802.1x environment. In at least some embodiments, doing so utilizes an association structure, such as a table, that is already resident at the authentication server. By using attributes other than a supplicant's MAC address, various matching scenarios can be provided by the authentication server in which authentication or authorization takes place responsive to satisfying conditions defined in the authentication server's association or database. Furthermore, a variety of non-authentication scenarios can be supported using the authentication server's association.

In the discussion that follows, a section entitled "Using the Port ID of a Port for Authentication" is provided and describes one example operating environment in which one or more embodiments can be employed. Following this, a section entitled "Authentication and Other Operations Using Other Information" is provided and describes various extensions in accordance with one or more embodiments. Last, a section entitled "Example Devices" provides a description of some example devices that can utilize the embodiments described below.

Using the Port ID of a Port for Authentication

Figure 1:
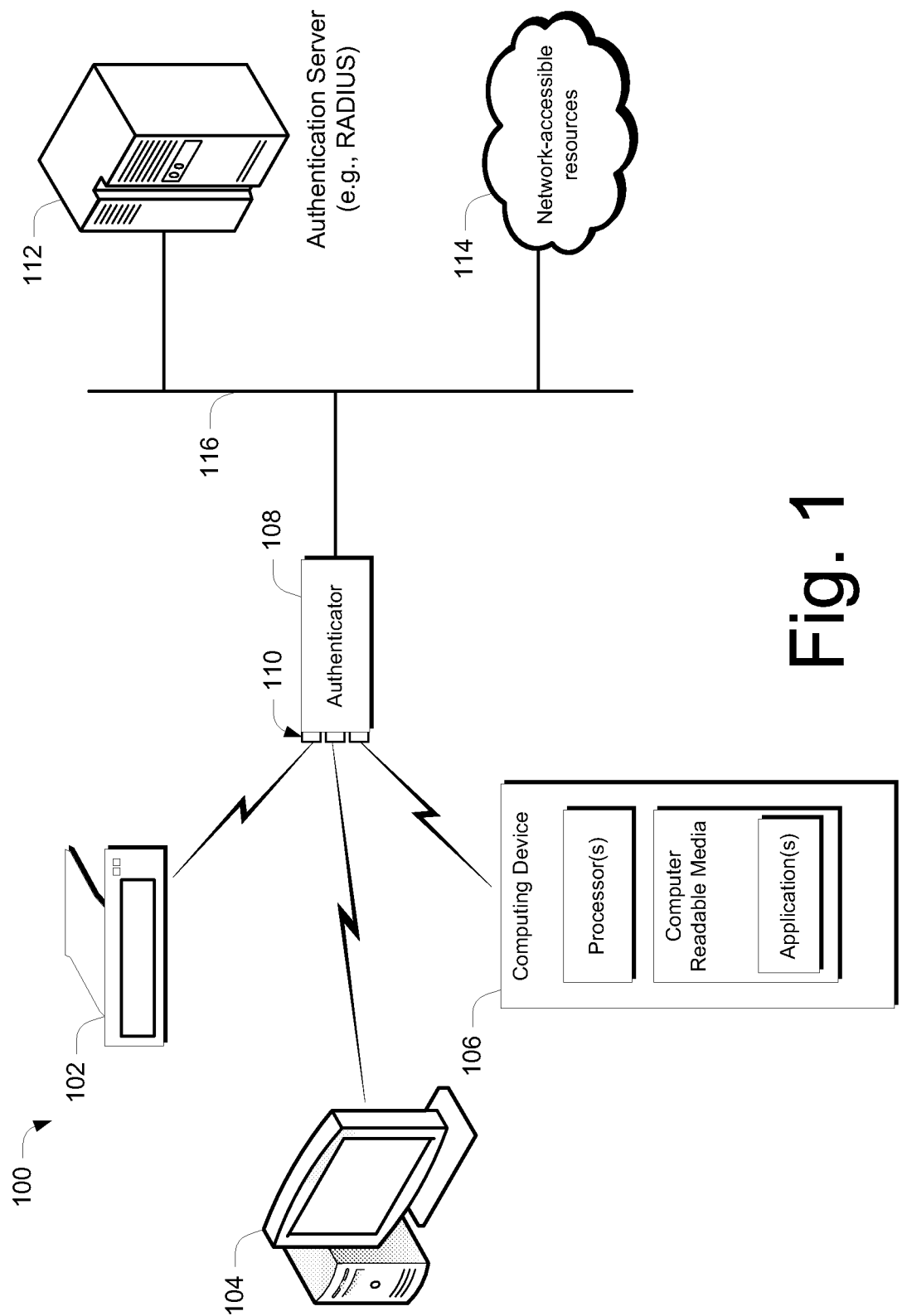
FIG. 1 illustrates an example 802.1x environment.
Figure 2:
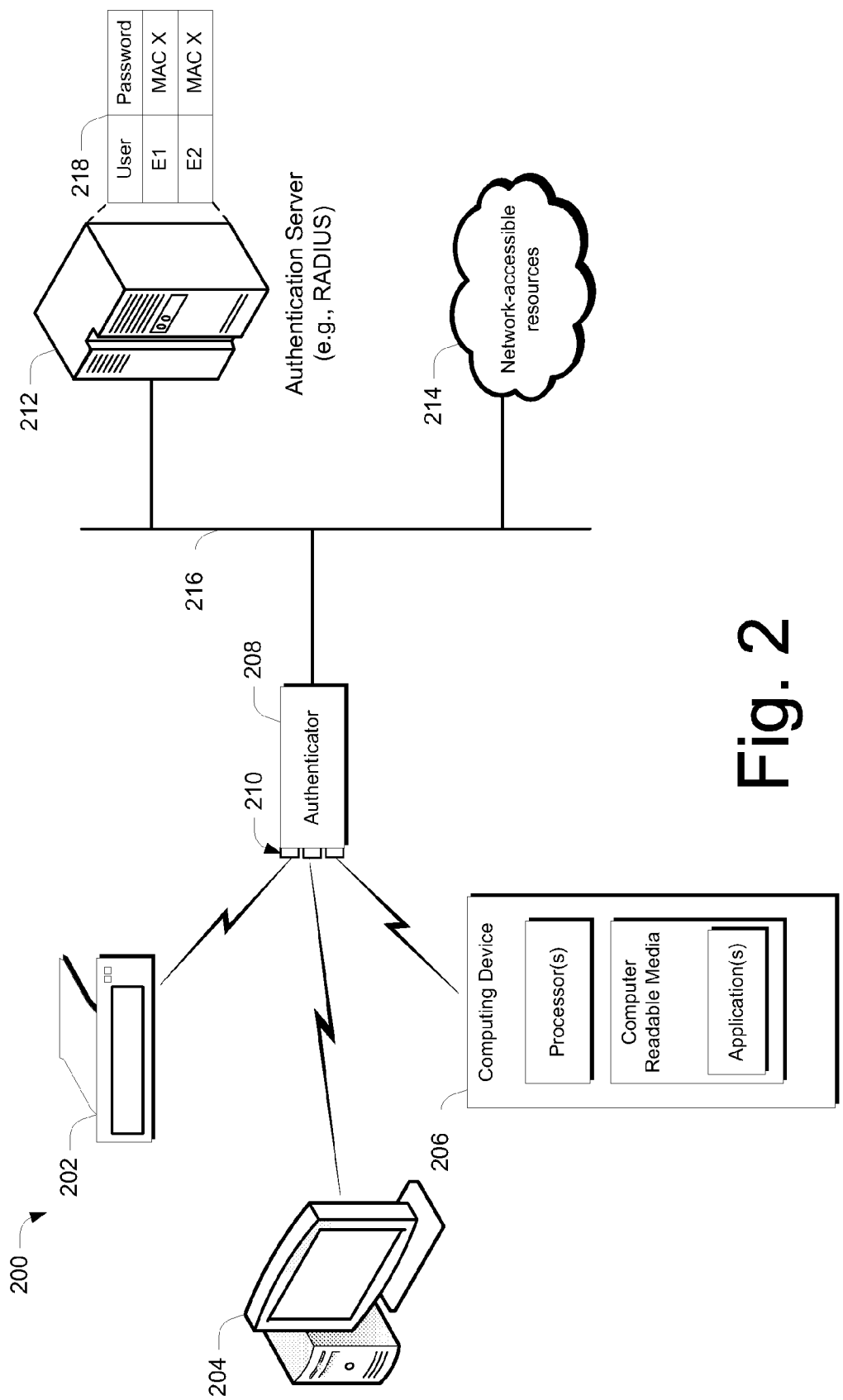
FIG. 2 illustrates an example 802.1x environment in accordance with one or more embodiments.

In one or more embodiments, a port ID (e.g., "E17") of an authenticator is used as a user name that is communicated to an authentication server. A password associated with the user name can include any suitable password such as the MAC address of a supplicant. As an example, consider FIG. 2 which illustrates an example 802.1x environment 200 in accordance with one or more embodiments.

Environment 200 can include various computing devices—e.g., a printer 202, computer 204, and/or any other type of computing device 206. Typically, computing devices that can utilize the principles described herein include any network-capable device with a CPU or microcontroller. Networks can include, by way of example and not limitation, Ethernet networks or 802.11 WiFi Wireless LANS. Examples of computing devices include, by way of example and not limitation, personal computers, personal digital assistants, smart-phones with data-capability, network-attached storage, services and data-servers (including multimedia servers, set-top boxes, DMAs and DMSs), network-attached consumer electronic devices, VoIP end-units and PBX's, Webcams, Net-enabled security devices, remote sensors, printers, plotters, digitizers, and a variety of other devices. Generally, computing devices such as computing device 206 include one or more processors, one or more computer readable media, and one or more applications than are executable by the processor(s). Environment 200 also includes an authenticator 208 having a plurality of ports 210 through which a connection to various computing devices can be made. In one embodiment, each of the ports 210 has a corresponding port ID, e.g., E1, E2 and the like.

Environment 200 also includes an authentication server 212 (e.g., a RADIUS server) and various network-accessible resources 214. The authenticator 208, authentication server 212, and network-accessible resources 214 are communicatively linked via a suitable network diagrammatically represented at 216.

In this particular example, authentication server 212 maintains or otherwise has access to a table 218 which provides an association between user names and passwords. The table 218 can be stored in a database or memory (not shown) that is accessible by the authentication server 212. In one example, individual entries in the user name column reside in the form of a port ID associated with a particular port on authenticator 208. Specifically, in this example, two entries in the user name column are "E1" and "E2". Notice also that in the password column, MAC addresses (i.e., "MAC X") of a supplicant are provided. In this case, table 218 provides a mapping between port IDs and MAC addresses.

Now, when a particular supplicant having a particular MAC address connects to a port on authenticator 208, the authenticator 208 can send an associated port ID and MAC address to the authentication server 212 for authentication. In this way, specific supplicants can be limited to specific ports on the authenticator 208. So, in the present example, if a supplicant corresponding to MAC address "MAC X" attempts to connect to the authentication server 212 using a port other than "E1" or "E2", authentication will fail. Alternately, the same supplicant connected through either of ports "E1" or "E2" will be successfully authenticated. By associating a particular port with a device and using the association as a basis for authentication, the problem of global authentication can be mitigated. Moreover, this approach is a better approach than configuring MAC-to-Port associations on the switch itself because this can be implemented in a central server rather than repeated in each switch. In addition, the methodology described above and below can enable scenarios such as using the same MAC as a password for two user names. In this case, a user can log in on any of the ports defined, but not in any other ports.

FIG. 3 is a flow diagram that describes steps in a method in accordance with one or more embodiments. The method can be implemented in connection with any suitable hardware, software, firmware, or combination thereof. In at least some embodiments, the steps can be implemented by a suitably configured authentication server operating in a network computing environment—e.g., 802.1x environment.

Step 300 provides an association, such as a table that includes a mapping between user names and passwords. The association can comprise any suitable association such as a general rule for users, a line-item per interface (e.g., per port, per-vlan) and the like. Step 302 provides, for the association, one or more user name entries other than a MAC address of an associated supplicant. One example of a user name entry other than a MAC address is the port ID of an associated port on an authenticator. Other user name entries can be used, as will become apparent below.

Step 304 provides, for the association, a password for an associated user name entry. Any suitable password can be provided. In at least some embodiments, the password comprises the MAC address of an associated supplicant.

Authentication and Other Operations Using Other Information

In one or more embodiments, information other than a port ID of an associated authenticator can be used as the user name. For example, typically authenticators have an associated IP address, a system name, a type, and/or a location. Each one of these items or a concatenation of two or more items can be used as a user name. For example, if location is used as a user name along with a particular MAC address for a supplicant, then authentication will only occur for the supplicant associated with the MAC address at the particular location identified by the user name. Thus, if the location specifies a particular building, then the associated supplicant will only be able to be authenticated when it is physically located in that building.

In yet other embodiments, a user name can include information such as a VLAN-ID, wild cards, or TLVs (Type/Length/Value sets) so that authentication can be extended to more than single ID cases. Including VLAN-ID information in a user name can allow actions-per-group, instead of just actions-per-single device. For example, if a VLAN-ID is sent, the same action can be applied to any and all devices assigned to the VLAN-ID. With respect to wild cards, a common action can be applied to any device assigned to a VLAN whose ID# starts with or otherwise includes a particular wild card or whose location code starts with or otherwise includes a particular wild card. With respect to TLVs, combinations of several attributes can be sent at once and a decision can be made for the attribute combination instead of being limited to a single ID. For example, a decision can be made for combination of which VLAN and which building (from location), or location and time-of-day. As an alternative to using a TLV, cycles of one ID string at a time can be sent, but can be repeated several times. A combination of answers received for the cycle can then be used for the whole group. Further, in at least some embodiments, encoding can be used to provide more robust information in the user name. For example, a DSA-TAG-like structure can be used to pass information associated with ingress interface (e.g. by which port/aggregated-link the frame came into the system), tagged/not (e.g. whether a frame was tagged with a VLAN ID when it was received into the system), LAG/Not (Link Aggregation Group) and the like. A DSA tag, which stands for "Distributed Switching Architecture" tag is a tag that is attached to frames that carry bit-encoded meta-attributes about an associated message to which it is attached. Such tags use a convention that can identify types which, in turn, identify information encoded in each bit or group of bits.

In one or more embodiments, the above-described approach can be used to not only allow access to a particular network, but for other purposes as well. For example, the above-described table mechanism can be used to enable or disable a particular resource such as a VLAN, or for quality of service issues. For example, a "question" can be sent to the server in the form of a pair of strings. Depending on the "answer" (e.g., "yes" or "no"), this answer can be used to enable/disable resources, or as a trigger to invoke configuration changes by suitable logic, including applying security and/or quality of service. Furthermore, other non-authentication scenarios can be supported using the above-described approach. For example, the above-described approach can be used for calling events. Consider, for example, an event called "weekend". In this case, a fictitious user name (i.e., "weekend") and password can be provided to the authentication server and can be used to ascertain whether the authentication server should enter into a weekend mode or not. This would avoid having to tell each authenticator to enter a weekend mode. Further, the above-described approach can be used to refine access such as by defining particular times of day that network resources can be accessed. For example, a string that is derived from the time of day can be sent to the server. The server can then make a decision based upon received information that includes the time of day.

In one or more embodiments, the above-described approach can be used in the context of 802.1x-aware devices that communicate with the authentication server using normal 802.1x protocols. However, leveraging the above-described approach can also allow for modifications that define how particular devices are allowed to interact with network-accessible resources. For example, an 802.1x-aware device may be authenticated to the system using its MAC address as both the user name and password. Additionally, however, table entries associated with that particular MAC address can define conditions associated with that device's interactions with the system. For example, there may be a table entry that indicates that for a particular device having a MAC address, access on the weekend is disallowed.

FIG. 4 is a flow diagram that describes steps in a method in accordance with one or more embodiments. The method can be implemented in connection with any suitable hardware, software, firmware, or combination thereof. In at least some embodiments, the steps can be implemented by a suitably configured authentication server operating in an 802.1x environment.

Step 400 provides an association, such as a table, that includes a mapping between user names and passwords. Examples of associations are provided above. Step 402 receives a user name entry other than a MAC address of a supplicant. Step 404 receives a password for the associated user name entry. Step 406 performs an operation based on the user name entry and its associated password.

In one or more embodiments, the operation performed at step 406 can be an authentication-related operation or one that is not associated with authentication. For example, as described above, an authentication-related operation can include authenticating a particular supplicant relative to a particular port ID, where the port ID is used as the user name and a supplicant's MAC address is used as the password. Alternately or additionally, different user names can be used to impart different types of functionality to the 802.1x environment. For example, using a user name in the form of an IP address in association with a MAC address as the password can enforce an IP-to-MAC association. Yet other user names can be used to define how and/or when a particular supplicant can interact with network-accessible resources.

Having now considered various embodiments, consider now a discussion of various types of devices that can utilize the inventive features described above. These examples constitute examples of devices, such as those shown in FIG. 2 at 202, 204 and 206 that can utilize the described embodiments. Other devices can be utilized without departing from the scope of the claimed subject matter.

Example Devices

Referring now to FIGS. 5-12, various example implementations of receiver environments are shown. The various receiver environments can utilize the techniques described above.

Figure 5:
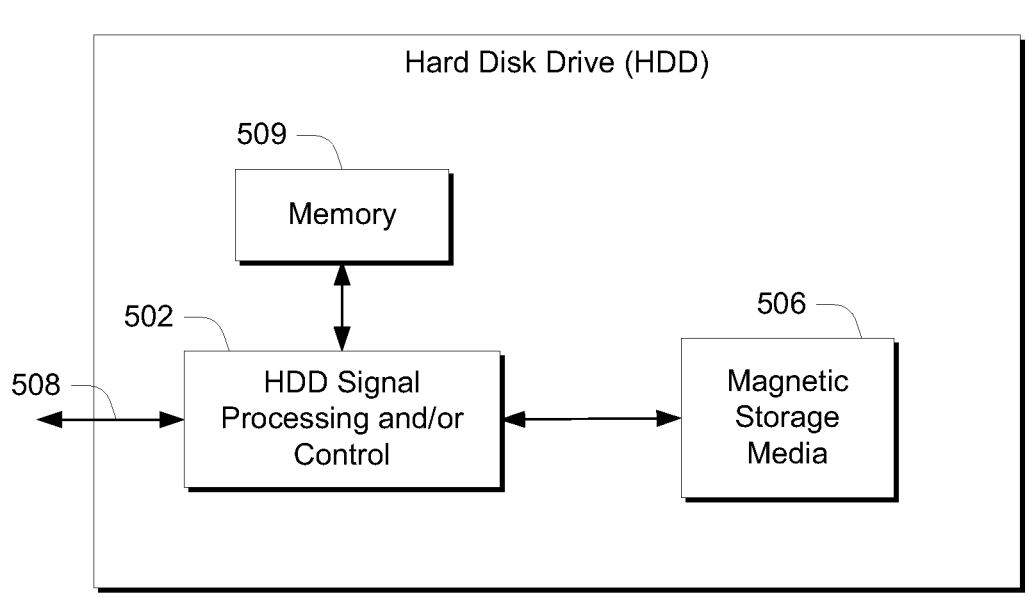
FIGS. 5-12 illustrate example devices in accordance with one or more embodiments.

Referring to FIG. 5, a device may be embodied in a hard disk drive (HDD) 500 and may compromise part of its signal processing and/or control circuits which are generally identified at 502. In some implementations, signal processing and/or control circuit 502 and/or other circuits (not shown) in HDD 500 may process data, perform coding, decoding and/or encryption, perform calculations, and/or format data that is output to and/or received from a magnetic storage medium 506.

HDD 500 may communicate with a host device (not shown) such as a computer, mobile computing devices such as personal digital assistants, cellular phones, media or MP3 players and the like, and/or other devices via one or more wired or wireless communication links 508. HDD 500 may be connected to memory 509, such as random access memory (RAM), a low-latency nonvolatile memory such as flash memory, read only memory (ROM) and/or other suitable electronic data storage.

Figure 6:
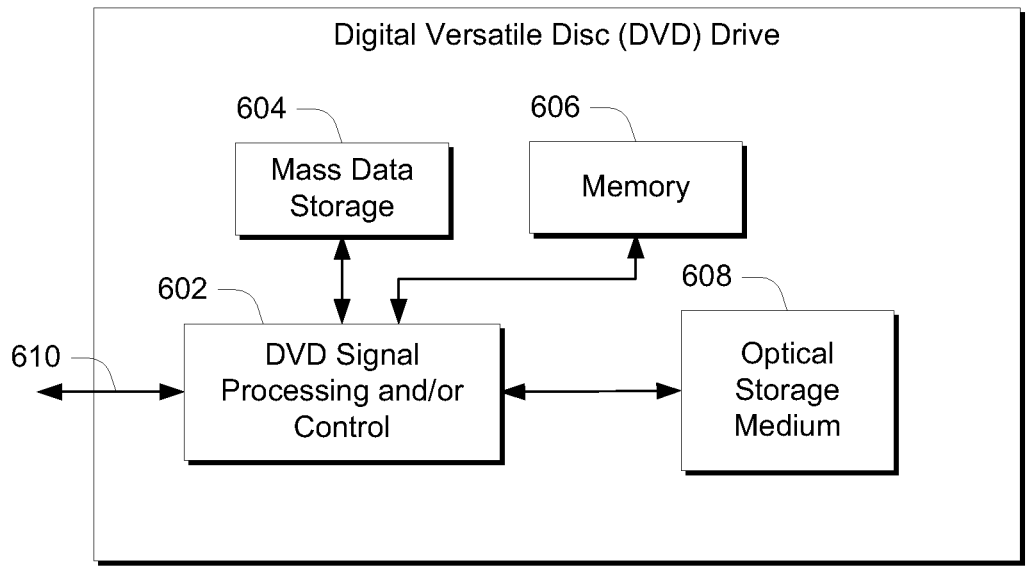

Referring now to FIG. 6, a device may be embodied in a digital versatile disc (DVD) drive 600 and may comprise part of its signal processing and/or control circuits, which are generally identified at 602. DVD drive 600 includes mass data storage 604, memory 606 and optical storage medium 608. Signal processing and/or control circuit 602 and/or other circuits (not shown) in DVD drive 600 may process data, perform coding, decoding and/or encryption, perform calculations, and/or format data that is read from and/or data written to an optical storage medium 608. In some implementations, signal processing and/or control circuit 602 and/or other circuits (not shown) in DVD drive 600 can also perform other functions such as encoding and/or decoding and/or any other signal processing functions associated with a DVD drive.

DVD drive 600 may communicate with an output device (not shown) such as a computer, television, or other device via one or more wired or wireless communication links 610. DVD drive 600 includes mass data storage 604 that stores data in a nonvolatile manner. Mass data storage 604 may include a hard disk drive (HDD) such as that shown in FIG. 5.

The HDD may be a mini HDD that includes one or more platters having a diameter that is smaller than approximately 1.8". DVD drive 600 may be connected to memory 606, such as RAM, ROM, low latency nonvolatile memory such as flash memory, and/or other suitable electronic data storage.

Figure 7:
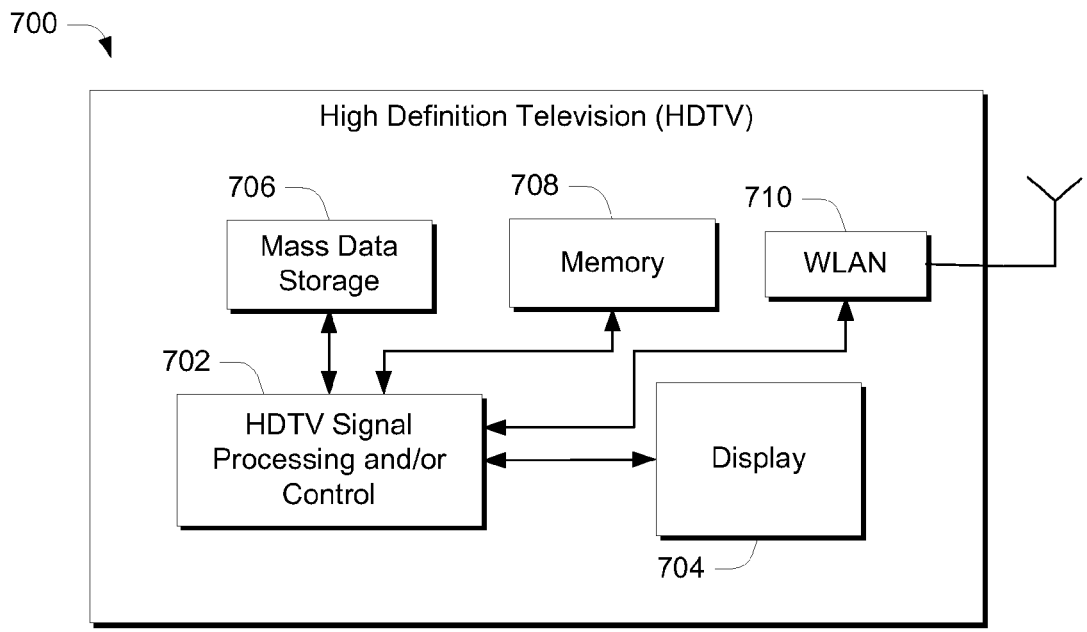

Referring now to FIG. 7, a device may be embodied in a high definition television (HDTV) 700 and may be implemented in either or both signal processing and/or control circuits, which are generally identified at 702, a wireless local area network (WLAN) interface 710 and/or mass data storage 706 of the HDTV 700. HDTV 700 receives HDTV input signals in either a wired or wireless format and generates HDTV output signals for a display 704. In some implementations, signal processing circuit and/or control circuit 702 and/or other circuits (not shown) of HDTV 700 may process data, perform coding, decoding and/or encryption, perform calculations, format data, and/or perform any other type of HDTV processing that may be required.

HDTV 700 may include mass data storage 706, which stores data in a nonvolatile manner such as optical and/or magnetic storage devices. At least one magnetic storage device may have the configuration shown in FIG. 5 and/or at least one optical storage device may have the configuration shown in FIG. 6. The magnetic storage device may be a mini HDD that includes one or more platters having a diameter that is smaller than approximately 1.8". HDTV 700 may also include memory 708 such as RAM, ROM, low latency nonvolatile memory such as flash memory and/or other suitable electronic data storage. HDTV 700 also may support connections with a WLAN via a WLAN interface 710.

Figure 8:
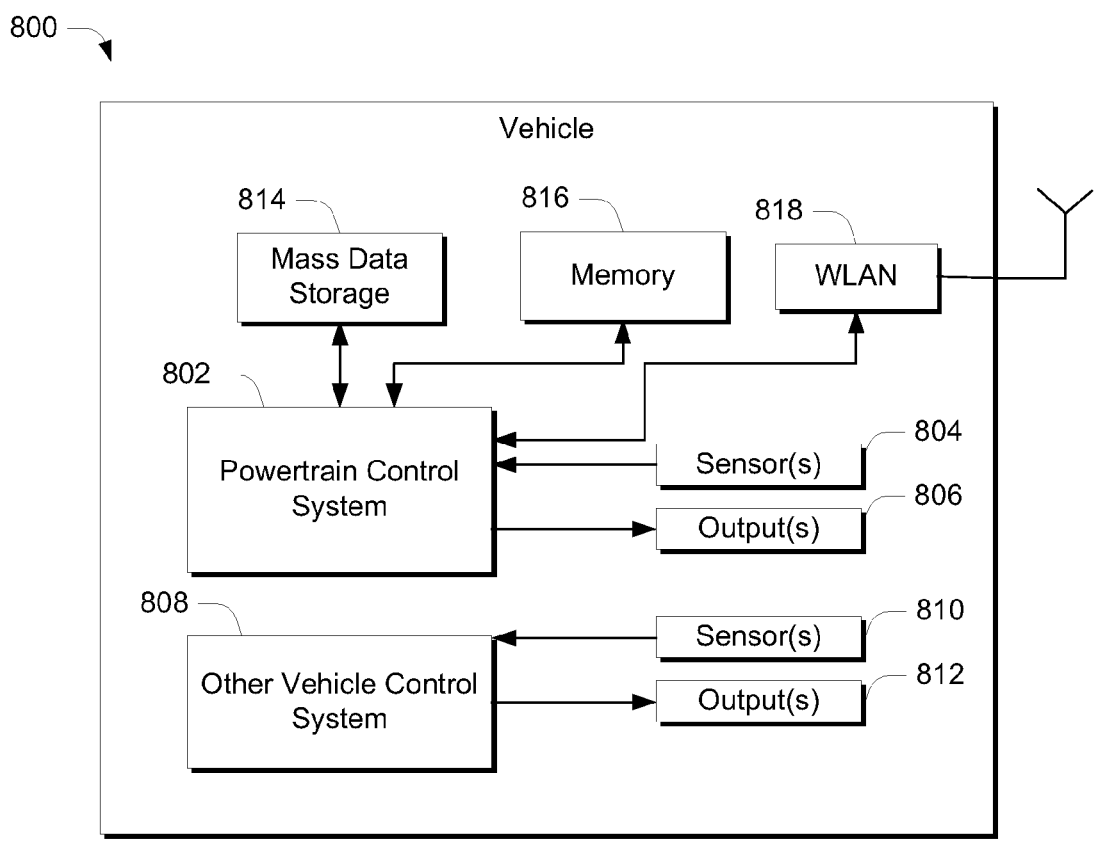

Referring now to FIG. 8, a device may be implemented as part of a communication system of a vehicle 800, a WLAN interface 818 and/or mass data storage 814 of the vehicle control system. In some implementations, a powertrain control system 802 receives inputs from one or more sensors 804 such as temperature sensors, pressure sensors, rotational sensors, airflow sensors, and/or any other suitable sensors that generate one or more output control signals 806, such as engine operating parameters, transmission operating parameters, braking parameters, and/or other control signals.

A device can be embodied in other control systems 808 of vehicle 800. Control system 808 may likewise receive signals from input sensors 810 and/or output control signals 812 to one or more output devices. In some implementations, control system 808 may be part of an anti-lock braking system (ABS), a navigation system, a telematics system, a vehicle telematics system, a lane departure system, an adaptive cruise control system, a vehicle entertainment system such as a stereo, DVD, compact disc, and the like. Still other implementations are contemplated.

Powertrain control system 802 may include mass data storage 814 that stores data in a nonvolatile manner. Mass data storage 814 may include optical and/or magnetic storage devices, for example, hard disk drives and/or DVD drives. At least one magnetic storage device may have the configuration shown in FIG. 5 and/or at least one optical storage device may have the configuration shown in FIG. 6. The magnetic storage device may be a mini HDD that includes one or more platters having a diameter that is smaller than approximately 1.8". Powertrain control system 802 may be connected to memory 816 such as RAM, ROM, low latency nonvolatile memory such as flash memory, and/or other suitable electronic data storage. Powertrain control system 802 also may support connections with a WLAN via a WLAN interface 818. The control system 808 may also include mass data storage, memory, and/or a WLAN interface (all not shown).

Figure 9:
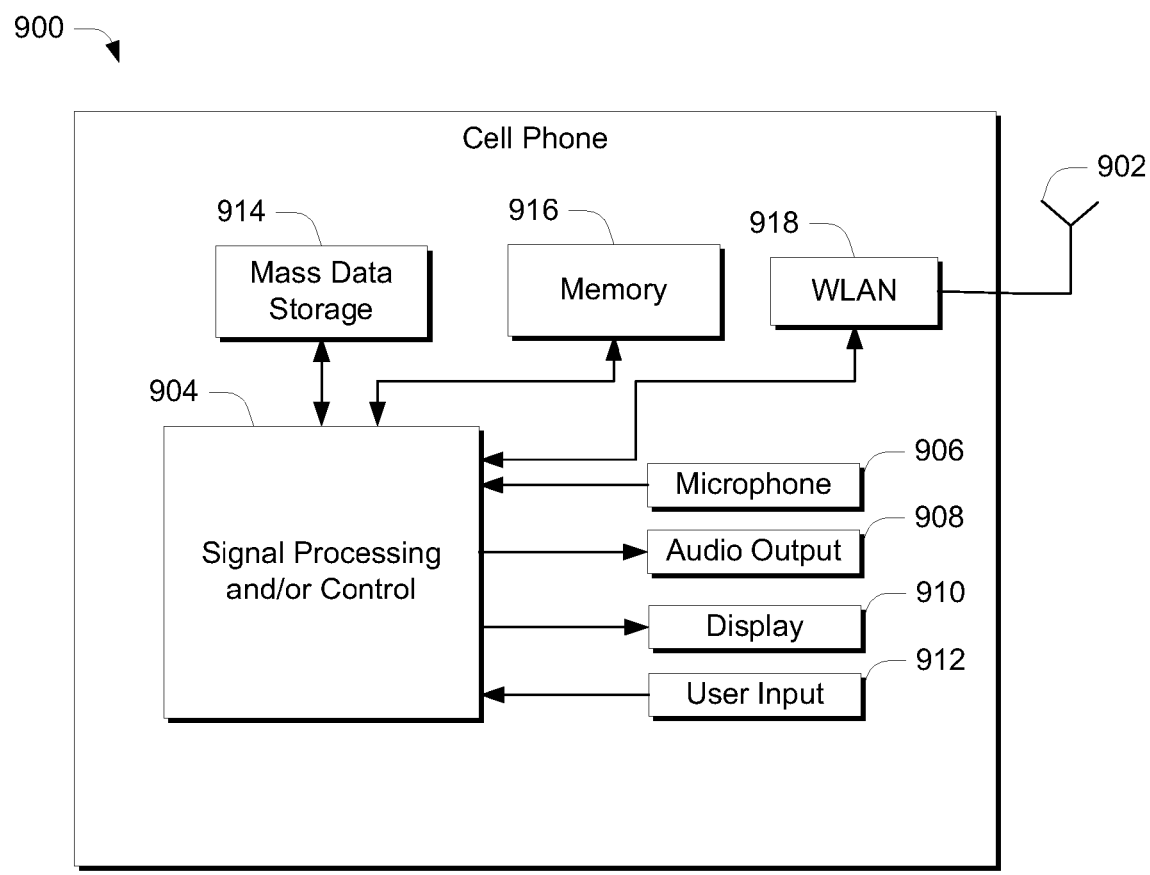

Referring now to FIG. 9, the device may be embodied in a cellular phone 900 that may include a cellular antenna 902. The receiver may be implemented in connection with either or both signal processing and/or control circuits, which are generally identified in at 904, a WLAN interface 918, and/or mass data storage of the cellular phone 900. In some implementations, cellular phone 900 includes a microphone 906, an audio output 908 such as a speaker and/or audio output jack, a display 910 and/or an input device 912 such as a keypad, pointing device, voice actuation, and/or other input device. Signal processing and/or control circuits 904 and/or other circuits (not shown) in cellular phone 900 may process data, perform coding, decoding and/or encryption, perform calculations, format data, and/or perform other cellular phone functions.

Cellular phone 900 may include mass data storage 914, which stores data in a nonvolatile manner such as optical and/or magnetic storage devices, for example, hard disk drives and/or DVD drives. At least one magnetic storage device may have the configuration shown in FIG. 5 and/or at least one optical storage device may have the configuration shown in FIG. 6. The magnetic storage device may be a mini HDD that includes one or more platters having a diameter that is smaller than approximately 1.8". Cellular phone 900 may be connected to memory 916 such as RAM, ROM, low latency nonvolatile memory such as flash memory, and/or other suitable electronic data storage. Cellular phone 900 also may support connections with a WLAN via WLAN interface 918.

Figure 10:
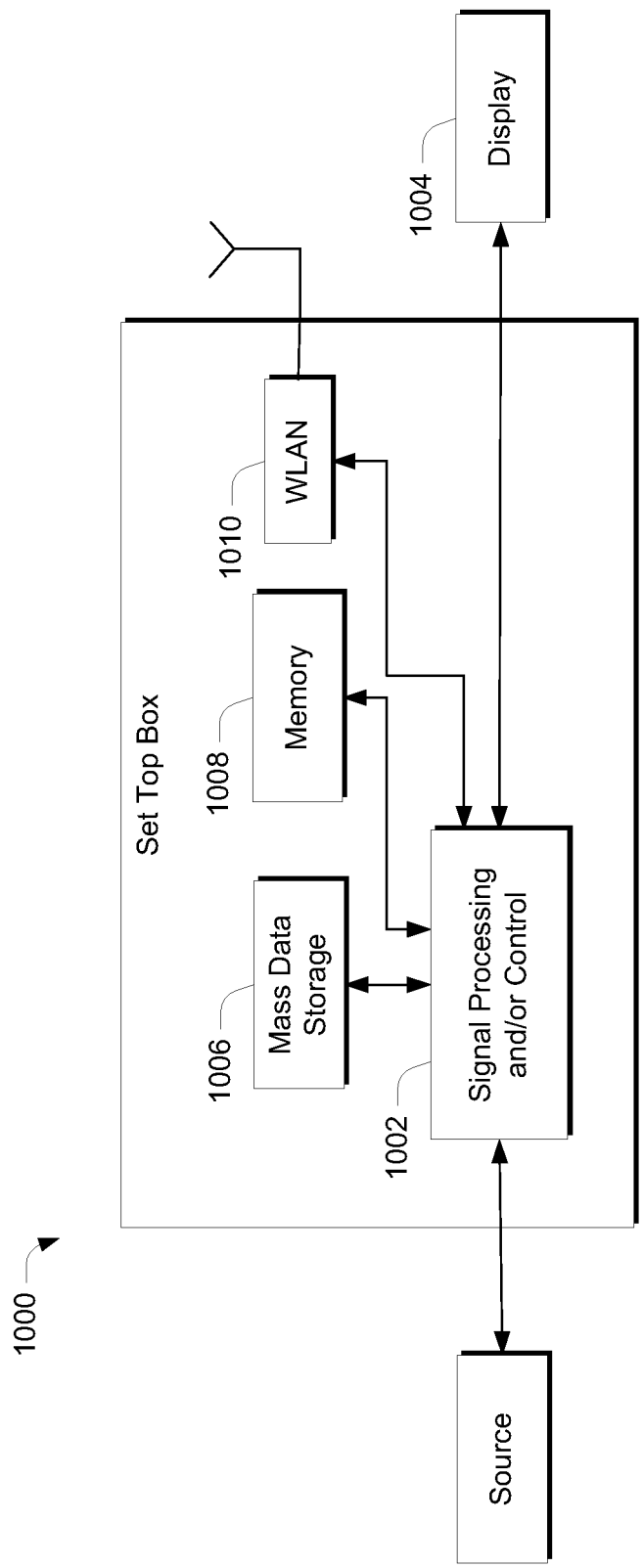

Referring now to FIG. 10, a device may be embodied in a set top box 1000, which may be implemented by either or both signal processing and/or control circuits, which are generally identified at 1002, a WLAN interface 1010, and/or mass data storage 1006 of the set top box 1000. Set top box 1000 receives signals from a source such as a broadband source and outputs standard and/or high definition audio/video signals suitable for a display 1004 such as a television and/or monitor and/or other video and/or audio output devices. Signal processing and/or control circuits 1002 and/or other circuits (not shown) of the set top box 1000 may process data, perform coding, decoding and/or encryption, perform calculations, format data, and/or perform any other set top box function.

Set top box 1000 may include a mass data storage 1006 that stores data in a nonvolatile manner. Mass data storage 1006 may include optical and/or magnetic storage devices, for example, hard disk drives and/or DVD drives. At least one magnetic storage device may have the configuration shown in FIG. 5 and/or at least one optical storage device may have the configuration shown in FIG. 6. The magnetic storage device may be a mini HDD that includes one or more platters having a diameter that is smaller than approximately 1.8". Set top box 1600 may be connected to memory 1008 such as RAM, ROM, low latency nonvolatile memory such as flash memory and/or other suitable electronic data storage. Set top box 1000 also may support connections with a WLAN via WLAN interface 1010.

Figure 11:
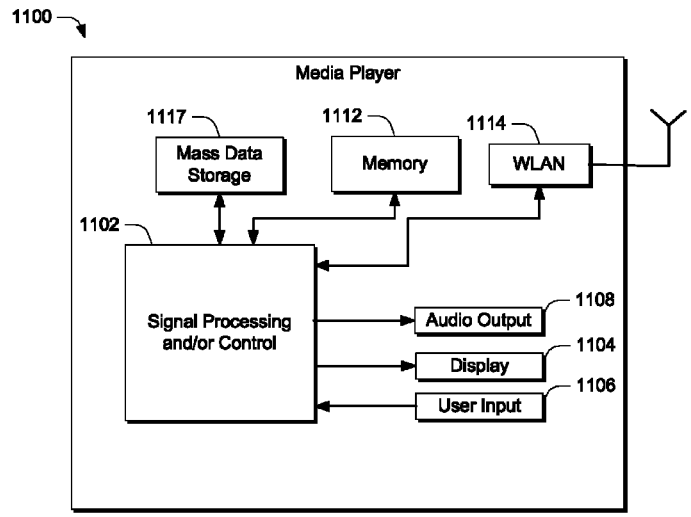

Referring now to FIG. 11, a device may be embodied in a media player 1100 and may be implemented in connection with either or both signal processing and/or control circuits, which are generally identified at 1102, a WLAN interface 1114, and/or mass data storage 1110 of the media player 1100. In some implementations, media player 1100 includes a display 1104 and/or a user input 1106 such as a keypad, touchpad, and the like. In some implementations, media player 1100 may employ a graphical user interface (GUI) that typically employs menus, drop down menus, icons, and/or a point-and-click interface via display 1104 and/or user input 1106. Media player 1100 further includes an audio output 1108 such as a speaker and/or audio output jack. Signal processing and/or control circuits 1102 and/or other circuits (not shown) of media player 1100 may process data, perform coding, decoding and/or encryption, perform calculations, format data, and/or perform any other media player function.

Media player 1100 may include mass data storage 1110 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices, for example, hard disk drives and/or DVD drives. At least one magnetic storage device may have the configuration shown in FIG. 5 and/or at least one optical storage device may have the configuration shown in FIG. 6. The magnetic storage device may be a mini HDD that includes one or more platters having a diameter that is smaller than approximately 1.8". Media player 1100 may be connected to memory 1112 such as RAM, ROM, low latency nonvolatile memory such as flash memory, and/or other suitable electronic data storage. Media player 1100 also may support connections with a WLAN via WLAN interface 1114.

Figure 12:
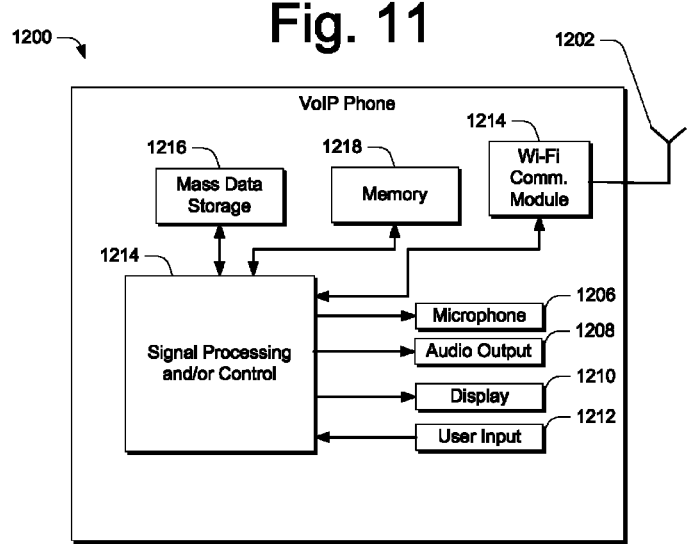

Referring to FIG. 12, a device may be embodied in connection with a Voice over Internet Protocol (VoIP) phone 1200 that may include an antenna 1202 or, alternately or additionally, in connection with a VoIP box that enables a conventional telephone to be plugged in and utilized with VoIP technology. The device may be implemented in connection with either or both signal processing and/or control circuits, which are generally identified at 1204, a wireless interface 1214, and/or mass data storage 1216 of the VoIP phone 1200. In some implementations, VoIP phone 1200 includes, in part, a microphone 1206, an audio output 1208 such as a speaker and/or audio output jack, a display monitor 1210, an input device 1212 such as a keypad, pointing device, voice actuation, and/or other input devices, and a Wireless Fidelity (Wi-Fi) communication module 1214. Signal processing and/or control circuits 1204 and/or other circuits (not shown) in VoIP phone 1200 may process data, perform coding, decoding and/or encryption, perform calculations, format data, and/or perform other VoIP phone functions.

VoIP phone 1200 may include mass data storage 1216 that stores data in a nonvolatile manner such as optical and/or magnetic storage devices, for example, hard disk drives and/or DVD drives. At least one magnetic storage device may have the configuration shown in FIG. 5 and/or at least one optical storage device may have the configuration shown in FIG. 6. The magnetic storage device may be a mini HDD that includes one or more platters having a diameter that is smaller than approximately 1.8". VoIP phone 1200 may be connected to memory 1218, which may be a RAM, ROM, low latency nonvolatile memory such as flash memory, and/or other suitable electronic data storage. VoIP phone 1200 is configured to establish communications link with a VoIP network (not shown) via Wi-Fi communication module 1214. Still other implementations in addition to those described above are contemplated.

CONCLUSION

In one or more embodiments, attributes other than a supplicant's MAC address can be used for the user name in the authentication process in a network computing environment, e.g. an 802.1x environment. In at least some embodiments, doing so utilizes structure, such as a table, that is already resident at the authentication server. By using attributes other than a supplicant's MAC address, various matching scenarios can be provided by the authentication server in which authentication or authorization takes place responsive to satisfying conditions defined in the authentication server's table or database. Furthermore, a variety of non-authentication scenarios can be supported using the authentication server's table.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, one or more steps of methods described above can be performed in a different order or concurrently to achieve desirable results.

What is claimed is:

1. A method comprising:
   receiving, from an authenticator having a plurality of ports through which connections to one or more computing devices can be made:
   a port identifier identifying one of the plurality of ports through which one of the one or more computing devices is connected to the authenticator; and
   one or more credentials identifying the one of the one or more computing devices, at least one of the one or more credentials including a location;
   authenticating the one of the one or more computing devices based on the one or more credentials and the port identifier; and
   responsive to authenticating the one of the one or more computing devices, permitting an action of the one of the one or more computing devices.

2. The method of claim 1, wherein authenticating is based on a mapping between the one or more credentials and the port identifier and further comprising using the mapping to permit the action of enabling or disabling a particular resource, calling events, or to defining particular times of day that network resources can be accessed.

3. The method of claim 1, wherein the one or more credentials includes a MAC address associated with the one of the one or more computing devices.

4. The method of claim 3, further comprising:
   receiving, from the authenticator:
   a second credential identifying a different user associated with the one of the one or more computing devices; and
   the MAC address; and
   authenticating the different user associated with the one of the one or more computing devices based on the MAC address, the second credential, and the port identifier.

5. The method of claim 1, wherein the one of the one or more computing devices and the one of the plurality of ports are connected through an Ethernet network.

6. The method of claim 1, wherein the one of the one or more computing devices and the one of the plurality of ports are connected through a wireless local area network.

7. The method of claim 1, wherein the location specifies a building, and wherein the authenticating based on the one or more credentials and the port identifier determines that the one of the one or more computing devices is in the building.

8. The method of claim 1, wherein the one or more credentials includes a VLAN-ID, the VLAN-ID enabling the authenticating to apply to an additional computing device of the one or more computing devices, the one of the one or more computing devices and the additional computing device assigned to the VLAN-ID.

9. The method of claim 8, wherein the VLAN-ID further includes a wild card, the wild card enabling the authenticating to permit common actions to both the one of the one or more computing devices and the additional computing device assigned to the VLAN-ID.

10. The method of claim 1, wherein the one or more credentials includes a type/length/value set.

11. One or more computer-readable memory devices storing code that, when executed by a processor, implements an authentication module configured to:
receive, from an authenticator having a plurality of ports through which connections to one or more computing devices can be made:
a port identifier identifying one of the plurality of ports through which one of the one or more computing devices is connected to the authenticator; and
one or more credentials identifying the one of the one or more computing devices, at least one of the one or more credentials including a VLAN-ID;
authenticate the one of the one or more computing devices based on the one or more credentials and the port identifier; and
permit an action of the one of the one or more computing devices.

12. The one or more computer-readable memory devices of claim 11, wherein authenticate the one of the one or more computing devices is based on a mapping between the one or more credentials and the port identifier.

13. The one or more computer-readable memory devices of claim 12, wherein the authentication module is implemented by an authentication server remote from the authenticator and the mapping is stored accessible by the authentication server.

14. The one or more computer-readable memory devices of claim 12, wherein the authentication module is further configured to use the mapping to permit the action of enabling or disabling a particular resource, calling events, or defining particular times of day that network resources can be accessed.

15. The one or more computer-readable memory devices of claim 11, wherein the VLAN-ID enables the authentication module to authenticate an additional computing device of the one or more computing devices that is assigned to the VLAN-ID.

16. The one or more computer-readable memory devices of claim 15, wherein the VLAN-ID further includes a wild card, the wild card enabling the authentication module to permit common actions to both the one of the one or more computing devices and the additional computing device that is assigned to the VLAN-ID.

17. The one or more computer-readable memory devices of claim 11, wherein at least one of the credentials includes a location associated with a building, the location enabling the authentication module to authenticate responsive to determining that the one of the one or more computing devices is in the building.

18. A method comprising:
receiving, from an authenticator, an authentication request including a port identifier identifying a port of the authenticator through which one or more computing devices are connected, a location specifying a building, and a MAC address of the one or more computing devices, the one or more computing devices attempting to access a network associated with the authenticator; and
transmitting, to the authenticator, an authentication response authenticating the one or more computing devices on the network based on the port identifier, the one or more computing devices being determined to be in the building, and the MAC address, the authentication of the one or more computing devices effective to allow the one or more computing devices to access the network.

19. The method of claim 18, wherein authenticating the one or more computing devices is based on a mapping between the port identifier and the MAC address.

20. The method of claim 18, wherein the authentication request further includes a VLAN-ID, the VLAN-ID enabling the authenticating to apply to an additional computing device of the one or more computing devices, the one of the one or more computing devices and the additional computing device assigned to the VLAN-ID.

* * * * *